United States Patent [19]

Sears

[11] 4,096,540
[45] Jun. 20, 1978

[54] PROTECTIVE RELAY CIRCUIT FOR REGULATED POWER SUPPLY

[75] Inventor: Kay G. Sears, Keyport, N.J.

[73] Assignee: Entron, Inc., Morganville, N.J.

[21] Appl. No.: 755,011

[22] Filed: Dec. 28, 1976

[51] Int. Cl.² ............................................. H02H 3/08
[52] U.S. Cl. ..................................... 361/93; 361/18
[58] Field of Search .................. 361/93, 98, 102, 42, 361/31, 187, 192; 323/9, 7; 363/50, 52, 47, 82; 322/27

[56] References Cited

U.S. PATENT DOCUMENTS

| 1,551,297 | 8/1925 | Fortescue | 361/111 |
|---|---|---|---|
| 2,873,419 | 2/1959 | Brandt | 363/52 |
| 3,364,392 | 1/1968 | Lafreniere | 361/88 X |
| 3,409,803 | 11/1968 | DeWitt, Jr. | 361/93 X |
| 4,015,171 | 3/1977 | Miller | 361/18 |

*Primary Examiner*—J. D. Miller
*Assistant Examiner*—Patrick R. Salce
*Attorney, Agent, or Firm*—Michael Ebert

[57] ABSTRACT

A protective relay circuit operating in conjunction with a regulated direct-current power supply in which a rectified A-C voltage having a ripple component is fed to an output terminal coupled to a load through the choke of a filter network. The excitation coil of a relay is connected between the input of the choke and the output terminal whereas the normally-closed relay switching contacts are interposed between the output of the choke and the output terminal. The relay coil has a high impedance relative to that of the chokes so that in normal operation, the coil has virtually no influence on the filter and does not pass the ripple component to the output terminal. In the event of a short effectively grounding the output terminal, the unfiltered rectified voltage is then imposed across the excitation coil to activate the relay and open the switching contacts, thereby disconnecting the supply from the shorting load. When the short is lifted and the current then produced by the load is insufficient to sustain the relay, the relay is automatically de-activated to restore the supply voltage.

6 Claims, 2 Drawing Figures

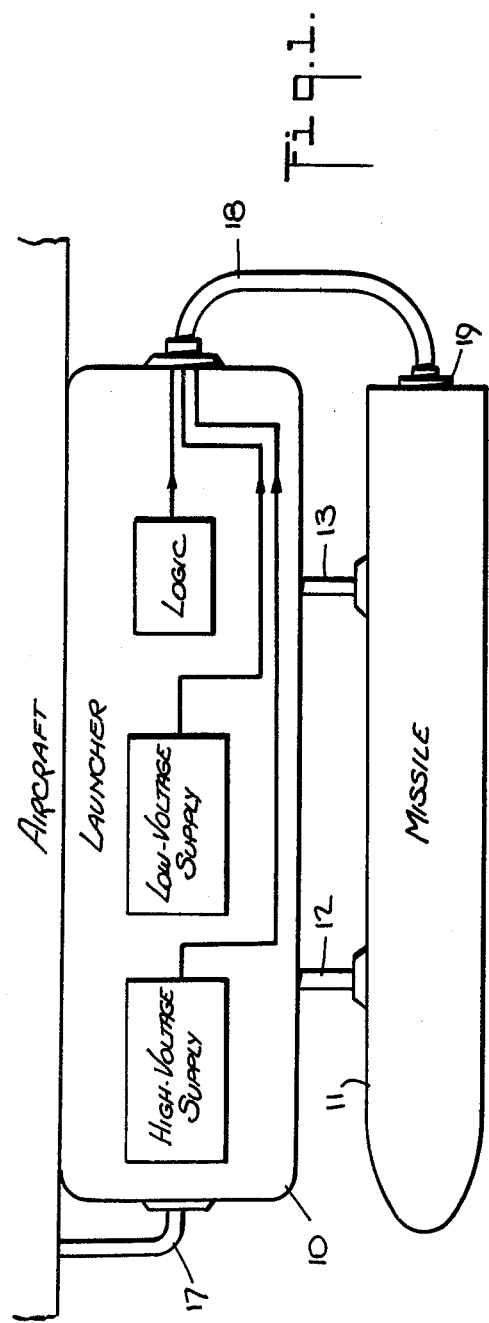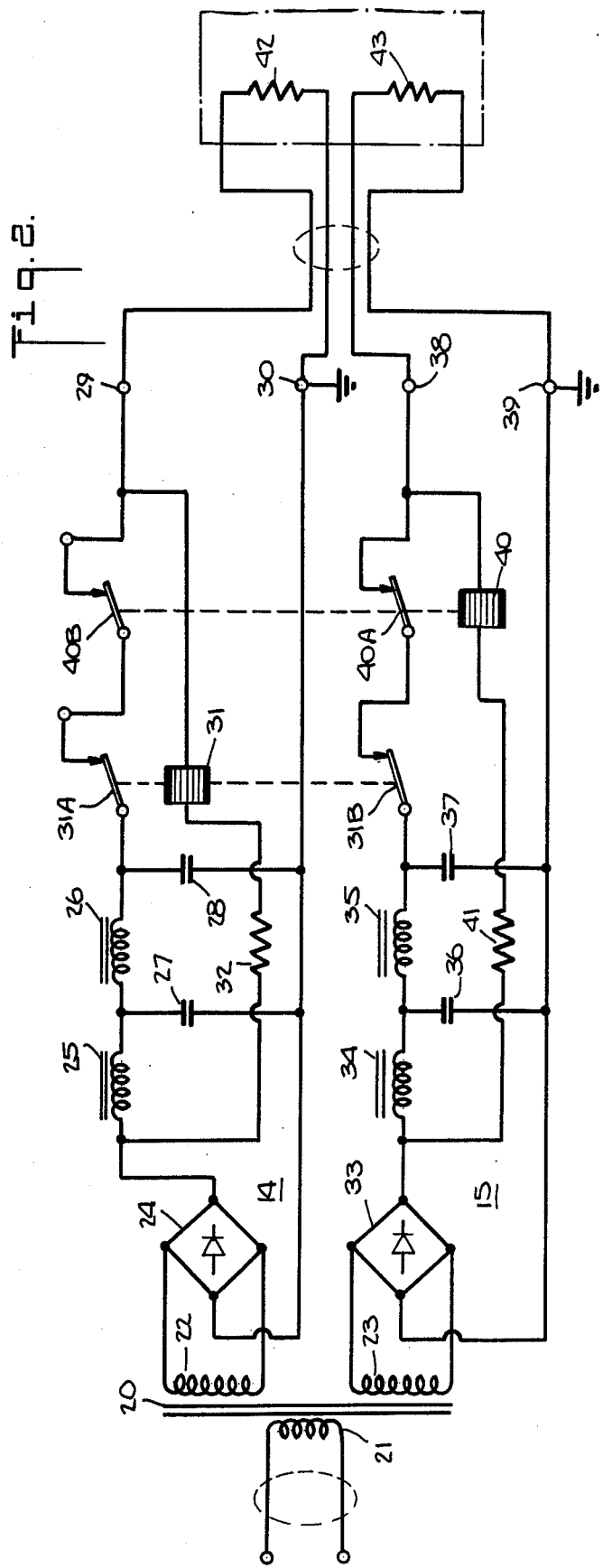

PROTECTIVE RELAY CIRCUIT FOR REGULATED POWER SUPPLY

BACKGROUND OF THE INVENTION

The invention relates generally to protective circuits for a regulated direct-current power supply, and more particularly to protective circuits incorporated in power supplies installed in a missile launcher.

Many forms of military aircraft are provided with guided missile launchers which are mounted on the wing tips or attached to the fuselage. The launcher is permanently secured to its aircraft mounting and is coupled by an umbilical cable to the missile. A connection between the cable and the missile is effected by a releasable coupler such that when the missile is fired and the missile slides off the launcher, the coupler is automatically disengaged to free the missile.

In one known form of launcher, the launcher includes two regulated direct-current power supplies, both of which are operated by an alternating-current generator in the aircraft. One power supply delivers 25 volts with a 3-amp maximum current through the cable to circuits contained in the missile, while the other delivers 175 volts with a 0.2 amp maximum current.

In some instances, because of a defective cable coupler, a decoupling action fails to take place when the missile is fired, as a consequence of which the cable which remains linked to the launcher is ruptured by the departing missile. Such cable rupture may result in a short circuit across one or both of the power supplies. The power supplies in the launcher are potted and shorts thereacross result in overheating of the supplies and the destruction thereof. A short may also occur prior to launching because of a defect in the missile circuits coupled by the cable to the supplies, with the same damaging consequences.

The obvious solution to the short-circuit problem is to provide a circuit-breaking relay in the output of each regulated power supply. The relay is connected across a resistor in series with the output of the supply such that when a short occurs for any reason, the resultant high voltage drop across the resistor activates the relay to open the relay switch contacts to disconnect the supply from the load, thereby preventing the short from damaging the supply.

The serious objection to this obvious protective arrangement is that in the absence of a short or an excessive load having an equivalent effect, the voltage drop across the series resistor in normal operation varies with changes in the load imposed on the regulated power supply by the associated missile circuits; hence the voltage regulation of the supply is impaired.

SUMMARY OF THE INVENTION

In view of the foregoing, it is the main object of this invention to provide a protective relay circuit for a regulated direct-current power supply which acts to disconnect the power supply from the load associated therewith in the event of a short circuit or an excessive load having an equivalent effect without, however, in any way impairing the normal operating characteristics of the supply.

More particularly, it is an object of the invention to provide a protective relay circuit of the above-noted type which acts to disconnect the supply from the shorting load and to automatically reset the connection when the short is lifted, thereby protecting the supply from overheating in the event of a short and immediately re-establishing the supply when the defective condition is cleared up.

Also, an object of this invention is to provide in a missile launcher having two separate power supplies linked by an umbilical cable to load circuits in the associated missile, a protective relay circuit of the above-type for each of the supplies, the protective circuits being interlocked such that if either relay is actuated, both supplies are disconnected from the missile circuits.

Briefly stated, these objects are attained in a protective relay circuit in accordance with the invention for protecting a regulated direct-current power supply in which a rectified A-C voltage having a ripple component is fed to an output terminal coupled to a load included in a filter network.

The excitation coil of the relay is connected between the input of the choke and the output terminal whereas the normally-closed relay switching contacts are interposed between the output of the chokes and the output terminal. The excitation coil has a high direct-current impedance relative to that of the chokes so that in normal operation the coil has virtually no influence on the filter and does not pass the ripple component to the output terminal.

In the event of a short effectively grounding the output terminal, the unfiltered rectified voltage is then imposed across the excitation coil to activate the relay and open the switching contacts, thereby disconnecting the output terminal from the supply. When the short is lifted and the current then produced by the load is insufficient to sustain the relay in the activated state, the relay is automatically de-activated to restore the filtered D-C supply voltage to the load.

In the case of a missile launcher having two regulated power supplies, each is provided with a protective relay circuit and each relay includes a second pair of normally-closed switching contacts connected in series with the switching contacts of the other relay, such that if either relay is actuated as a result of a short, both supplies are disconnected from their associated loads.

OUTLINE OF THE DRAWINGS

For a better understanding of the invention as well as other objects and further features thereof, reference is made to the following detailed description to be read in conjunction with the accompanying drawings, wherein:

FIG. 1 schematically shows a missile launcher which is provided with power supplies incorporating protective relay circuits in accordance with the invention;

FIG. 2 is a schematic circuit diagram of the power supplies in the launcher.

DESCRIPTION OF THE INVENTION

Referring now to FIG. 1, there is shown a launcher 10 mounted on an aircraft at an appropriate position thereon for launching a missile 11. Missile 11 is supported below launcher 10 by brackets 12 and 13 having slide rails such that when the missile is fired, it slides out of the launcher and flies toward its target.

Contained within launcher 10 are two regulated direct-current power supplies 14 and 15, supply 14 being a high-voltage supply (i.e., 175 volts with a 0.2 amp maximum current) and supply 15 being a low-voltage supply (i.e., 25 volts with a 3 amp maximum current). Also included in the launcher is a logic circuit 16 whose function is unrelated to the present invention.

The power supplies are operated from an A-C generator contained in the aircraft, the A-C being fed to the supplies through a cable 17. The regulated direct voltages from the supply and the logic circuits are linked to circuits in missile 11 by an umbilical cable 18 which is attached to an input socket on missile 11 by a releasable coupler 19 such that when the missile is fired, the coupler is disengaged from the socket and the missile is free to take off.

But should the coupler be defective and fail to release when the missile is fired, umbilical cable 18 will be ruptured on take-off and an electrical short may occur which is imposed on either or both power supplies 14 and 15. These power supplies are potted and are incapable of withstanding the high temperatures that are developed by a short or an excessive load having an equivalent effect. Hence, unless the effect of a short is quickly removed, the supplies will be damaged beyond repair.

It is also important, should a short be applied across one supply but not the other, that both supplies then be disconnected from the missile circuits, unless both supplies are effective, the continual operation of one supplied missile circuit with the other inoperative is undesirable.

Referring now to FIG. 2, there is shown in simplified form the power supplies 14 and 15 and the protective relay circuits in accordance with the invention incorporated therein. Common to both supplies is a power transformer 20 having a primary winding 21 connected by cable 17 to the A-C generator in the aircraft. Transformer 20 is provided with a high-voltage secondary 22 and a low-voltage secondary 23.

High voltage secondary 22 is connected to the input junctions of a full-wave rectifier bridge 24 whose output junctions are connected to a filter network formed by series-connected chokes 25 and 26 and filter capacitors 27 and 28. The input to the chokes is the rectified A-C yielded by bridge 24 which has a ripple component, and the output thereof is a constant D-C voltage which is applied to output terminal 29, the other terminal 30 being the grounded chasis of the supply. Included in the power supply are conventional voltage regulating means (not shown) to stabilize the voltage output despite changing load conditions.

Connected between the input of series-connected chokes 25 and 26 and output terminal 29 is the excitation coil of a relay 31 provided with a main set of normally-closed switching contacts 31A and an auxiliary set 31B. Contacts 31A of the main set are interposed between the output of the chokes and output terminal 29. In series with excitation coil circuit is a resistor 32, this resistor being optional to increase the effective impedance of the coil circuit.

Low-voltage secondary 23 is connected to the input junctions of a full-wave rectifying bridge 33 whose output junctions are connected to a filter network formed by series-connected chokes 34 and 35 and filter capacitors 36 and 37. The input to these chokes is the low-voltage rectified A-C yielded by bridge 33 and the output thereof is a constant D-C voltage which is applied to an output terminal 38, the other terminal 39 being the grounded chassis of the supply. Conventional voltage regulating means are also included in this supply.

Connected between the input of series-connected chokes 34 and 35 and output terminal 38 is the excitation coil of a relay 40 provided with a main set of normally-closed switching contacts 40A and an auxiliary set 40B. Contacts 40A of the main set are interposed between the output of the chokes and output terminal 39. In series with the excitation coil circuit is a resistor 41 whose presence is optional to increase the impedance of the coil circuit.

Relay contacts 40B are connected in series with relay contacts 31A between the output terminal 29 and the filter chokes of the high-voltage supply 14 such that if either of these normally-closed contacts is caused to open, the high-voltage supply will be interrupted. Output terminal 29 and terminal 30 are connected through umbilical cable 18 to circuits in missile 11 represented by load resistor 42.

Relay contacts 31B are connected in series with relay contacts 40A between the output terminal 38 and the filter chokes of the low-voltage supply 15 such that if either of these normally-closed contacts is caused to open, the low-voltage supply 15 will be interrupted. Output terminal 38 and terminal 39 are connected through umbilical cable 18 to circuits in missile 11 represented by load resistor 43.

We shall now consider the operation of the low-voltage regulated power supply 15 which in the example given has an output of 25 volts at a 3 amp maximum. The D-C impedance of chokes 34 and 35 is very low, whereas the impedance of the excitation coil of relay 40 imposed across these chokes is relatively high, in the order of 5000 ohms. Hence the relay coil does not pass the ripple voltage from the rectifier bridge to the output terminals.

When, however, output terminal 38 is effectively grounded by reason of a short, the rectified voltage yielded by bridge 33 is then directly applied across the excitation coil of relay 40 whose operating characteristics are such that it is activated at about 21 volts, which is somewhat below the 25 volt output of this supply.

Thus a short results in activation of relay 40, which causes both contacts 40A and 40B to open, thereby disconnecting the high-voltage and low-voltage supplies from their associated missile loads. When this short is lifted, relay 40 is de-activated to restore the supplies.

It will be seen, therefore, that the protective relays in no way interfere with or modify the normal operating characteristics of the power supplies, and yet in the event of a short or an equivalent excessive load imposed on either supply, serve to disconnect both supplies as long as the short exists and to restore both supplies as soon as the short is lifted.

It is to be noted, however, that each protective relay will only reset to restore the supply voltage when the short imposed on the supply is lifted under conditions where the load then imposed on the supply is light enough to prevent the relay from being held in its operative state. One must bear in mind, that once the relay is energized by a given current it takes a much lower coil current to maintain the relay energized.

If therefore the missile coupled to the launcher develops a short circuit, the relay will be activated thereby. If thereafter the short circuit for some reason is cleared and the light load then imposed on the supply is more or less normal, it may nevertheless be sufficient to produce a current flow through the relay to sustain the relay in its energized state, so that the power supply remains cut-off even though a short no longer exists.

In this case, in order to effect reset of the relay it would be necessary to cut off the source voltage applied to the primary of the supply. The behavior of the protective relay under these circumstances is not a disadvantage. From the pilot's standpoint, once a missile on the wingtip on a plane has for some reason malfunctioned and imposed a short on the power supplies associated therewith, even if this short for some reason later clears up, that missile is suspect and is no longer acceptable.

While there have been shown and described preferred embodiments of a protective relay circuit for a regulated power supply in accordance with the invention, it will be appreciated that many changes and modifications may be made therein without, however, departing from the essential spirit thereof.

I claim:

1. A protective relay circuit for a regulated direct-current power supply in which the output of a rectifier is connected through the choke of a filter network to an output terminal coupled to a load, said circuit comprising a relay having a set of normally-closed main contacts and an excitation coil, said coil being connected between the input of said choke and said output terminal, said main contacts being interposed between the output of said choke and said output terminal, said coil having a D-C impedance which is high relative to that of said choke whereby in the absence of a short the coil has virtually no influence on the operating characteristics of the supply, said relay being activated by the rectifier output voltage when a short or an equivalent excessive load is imposed on said output terminal, said relay being de-activated to restore the supply when the short is lifted and the current produced by said load is insufficient to sustain said relay in the activated state.

2. Protective circuits as set forth in claim 1, for two power supplies, each circuit including an auxiliary set of relay contacts connected in series with the main contacts of the other circuit whereby a short imposed on either supply causes an interruption of both supplies.

3. A circuit as set forth in claim 1, further including a resistor connected in series with said excitation coil.

4. A circuit as set forth in claim 1, wherein said relay has an impedance of at least 5000 ohms.

5. A circuit as set forth in claim 1 wherein said choke is constituted by two series connected choke sections.

6. A protective relay circuit as set forth in claim 1 included in a power supply housed in a missile launcher mounted on an aircraft and energized by an a-c generator included in the aircraft, said power supply being coupled to circuits in the missile by an umbilical cable having a releasable coupler whereby should said missile be fired and the cable fail to decouple and be ruptured to produce a short, the protective relay circuit acts to prevent destruction of the power supply.

* * * * *